US008411347B2

(12) United States Patent
Archambeau et al.

(10) Patent No.: US 8,411,347 B2
(45) Date of Patent: Apr. 2, 2013

(54) COMPOSITION COMPRISING PHOTOCHROMIC DYES IN AN IONIC SOLVENT

(75) Inventors: Samuel Archambeau, Charenton-le-Pont (FR); Jean-Paul Cano, Charenton-le-Pont (FR); Corinne Galley, Toulouse (FR); Francois Malbosc, Toulouse (FR)

(73) Assignee: Essilor International (compagnie Generale D'optique), Charenton le Pont (FR)

( * ) Notice: Subject to any disclaimer, the term of this patent is extended or adjusted under 35 U.S.C. 154(b) by 104 days.

(21) Appl. No.: 12/920,883

(22) PCT Filed: Mar. 2, 2009

(86) PCT No.: PCT/FR2009/050339
§ 371 (c)(1),
(2), (4) Date: Sep. 3, 2010

(87) PCT Pub. No.: WO2009/115721
PCT Pub. Date: Sep. 24, 2009

(65) Prior Publication Data
US 2011/0013252 A1    Jan. 20, 2011

(30) Foreign Application Priority Data
Mar. 5, 2008  (FR) ...................................... 08 51442

(51) Int. Cl.
*G02F 1/03*          (2006.01)

(52) U.S. Cl. ........................................ 359/241; 359/265
(58) Field of Classification Search .................. 359/241
See application file for complete search history.

(56) References Cited

U.S. PATENT DOCUMENTS 4,720,356 A * 1/1988 Chu .............................. 252/586
2004/0257633 A1 * 12/2004 Agrawal et al. ............... 359/265

OTHER PUBLICATIONS

S. Arzhantsev et al. "Solvation dynamics of Coumarin 153 in Several Classes of Ionic Liquids: Cation Dependence of the Ultrafast Component," Chemical Physics Letters, 381:278-289 (2003) XP002500840.
F. Pina et al., "Photochromism of 7-(N,N-diethylamino)-4'-hydoxyflavylinium in a Water-Ion Liquid Bi-phasic System," Chem. Comm., 1608-1610 (2007) XP002500841.
C. Chiappe et al., "Ionic Liquids: Solvent Properties and Organic Reactivity," J. Phys. Org. Chem. 18:275-297 (2005) XP002500842.

* cited by examiner

*Primary Examiner* — James Jones
(74) *Attorney, Agent, or Firm* — Occhiuti Rohlicek & Tsao LLP

(57) ABSTRACT

A photochromic composition that is liquid at 20° C. and includes (a) at least one photochromic dye and (b) an ionic solvent selected from (b)(i) room-temperature ionic liquids (RTIL), (b)(ii) ionic liquid mixtures that are liquid at room temperature, and (b)(iii) room-temperature liquid mixtures of at least one ionic liquid and at least one organic solvent that is miscible therewith. The use of said photochromic composition in optical devices such as ophthalmic lenses is also described.

12 Claims, No Drawings

COMPOSITION COMPRISING PHOTOCHROMIC DYES IN AN IONIC SOLVENT

CROSS-REFERENCE TO RELATED APPLICATIONS

This application is the National Stage of International Application No. PCT/FR2009/050339, filed on Mar. 2, 2009, which claims the priority of French Application No. 0851442 filed on Mar. 5, 2008, the contents of which are incorporated herein by reference in their entirety.

The present invention relates to photochromic compositions which are liquid at ambient temperature and which comprise photochromic dyes dissolves in a solvent phase based on one or more ionic liquid(s), and to optical devices including such liquid compositions.

Photochromism is a well known physical phenomenon observed in certain classes of compounds. A detailed discussion of this phenomenon may be found in "Photochromism: Molecules and Systems", Studyes in Organic Chemistry, 40, edited by H. Durr and H. Bouas-Laurent, Elsevier, 1990.

Passive photochromic devices, that is to say devices comprising photochromic dyes with an absorbance which depends solely on the presence or absence of UV light, typically exhibit rapid activation (coloration) for several minutes, indeed even tens of minutes, are generally necessary for return to the colorless state.

This slow deactivation (decoloration) represents a problem for the user of photochromic spectacles as he finds himself obliged to remove them when he rapidly passes from a bright environment to a dark place.

The rate of deactivation of photochromic dyes depends not only on their chemical structure, but also, in a not insignificant fashion, on the matrix in which they are present. It has thus been possible to show that the decoloration of photochromic dyes is virtually always faster in a liquid medium than in a solid medium.

The problem of the manufacture of optical components, in particular of ophthalmic lenses, capable of comprising a liquid phase, has recently been solved by the Applicant Company.

French patent application FR 2 872 589 thus discloses a process for the manufacture of a transparent optical component comprising an assembly of closed cells, separated from one another, which are placed side by side parallel to a surface of said optical component. Each cell can be filled with an appropriate optical material, liquid or solid, so that the assembly of the cells thus filled confers, on the component, a required optical characteristic, such as photochromism.

In such an application, the liquid matrix accommodating the photochromic dyes must exhibit the following properties:
- non toxicity,
- ability to dissolve the photochromic dye,
- absence of coloration,
- transparency, in particular to UV radiation,
- refractive index at least equal to 1.5 (limit of the refractive index of the constituent organic substrates of ophthalmic lenses),
- low vapor pressure,
- thermal and photochemical stability,
- chemical inertia with regard to the photochromic dye and with regard to the material forming the wall of the chambers.

The Applicant Company, in the context of its research targeted at developing increasingly effective photochromic optical components, has discovered that a certain family of components, known as such, can advantageously be used as liquid matrix for the dissolution of photochromic dyes for the purpose of the manufacture of photochromic optical devices, such as those described in FR 2 872 589.

These compounds, proposed here for the first time for the dissolution of photochromic dyes, are ionic liquids. Ionic liquids are liquids which essentially comprise only ions. In the general sense, this term encompasses all molten salts, for example sodium chloride at a temperature greater than 800° C., but today the term "ionic liquid" is commonly used to denote salts having a melting point of less than 100° C.

Ionic liquids encompass in particular a group of ionic compounds which are liquid at ambient temperature (20° C.) and which are known as "room-temperature ionic liquids" (RTIL).

It is also known to use mixtures of ionic liquids having a melting point lower than that of each of the pure ionic liquids.

The advantage of using eutectic mixtures of ionic liquids is also used. The term "eutectic mixture" is understood to mean a mixture of compounds having a melting point lower than the melting point of any other mixture of these same compounds.

Eutectic mixtures of ionic liquids having melting points spectacularly lower than those of their components have been described in particular. This phenomenon, known as "deep eutectic phenomenon", was described for the first time in 2003 for a mixture of urea and choline chloride.

It is also possible to reduce the melting point of ionic liquids by combining them not with one another but with a conventional organic solvent miscible with the salt (ionic liquid) for which it is desired to lower the melting point.

In the description below, the liquid matrix based on ionic liquid(s) used to dissolve one or more photochromic dyes will be referred to systematically as "ionic solvent". This term here has a broader meaning than "ionic liquid" and encompasses any liquid having a melting point of less than 20° C. and comprising, in total, at least 50% by weight, preferably at least 70% by weight, of one or more "ionic liquids" as defined above (organic salts having a melting point of less than 100° C.).

A subject matter of the present invention is consequently a photochromic composition which is liquid at 20° C. and which comprises (a) at least one photochromic dye and (b) an ionic solvent.

Another subject matter of the invention is such a composition in the manufacture of an optical device and an optical device comprising such a composition.

As explained above, ionic liquids are known as such. As explained in the introduction, not all ionic liquids are liquid at ambient temperature and it is necessary either to select those which have a melting point of less than 20° C., preferably at less than 0° C., and in particular less than −10° C. or to combine them with another ionic liquid or else with an appropriate organic solvent in proportions such that the melting point of the homogeneous mixture obtained is less than 20° C., preferably less than 0° C., in particular less than −10° C.

In other words, the ionic solvent used to dissolve one or more photochromic dyes is preferably chosen from:
- (b) (i) room-temperature ionic liquids (RTIL),
- (b) (ii) mixtures, liquid at ambient temperature, of ionic liquids,
- (b) (iii) mixtures, liquid at ambient temperature, of at least one ionic liquid and of at least one organic solvent which is miscible with the ionic liquid(s).

The above components (b) (i), (b) (ii) and (b) (iii) preferably have a melting point of less than 0° C. and in particular a melting point of less than −10° C. This is because it is desirable for the liquid matrix (ionic solvent) not to solidify at relatively low temperatures which the user of the optical device of the present invention is liable to encounter in winter and/or at altitude.

In one embodiment of the present invention, the mixture of ionic liquids (b) (ii) is a eutectic mixture of at least two ionic liquids, that is to say a mixture having a lower boiling point than any other mixture of these ionic liquids.

Several hundred ionic liquids are currently known and the synthesis and characterization of new members of this family of compounds is in progress. It is consequently impossible to give here an exhaustive list of compounds capable of meeting the above criteria of fusibility and miscibility.

The ionic liquids used in the present invention are preferably chosen from organic salts of formula $Q^+A^-$ in which $Q^+$ represents an organic cation chosen from quaternary and ternary ammonium, quaternary phosphonium, ternary sulfonium and guanidinium ions, and
$A^-$ represents any organic or inorganic anion capable of forming, with $Q^+$, a salt having a melting point of less than 100° C.

Room-temperature ionic liquids (RTIL) can be defined analogously as preferably being chosen from the salts of formula $Q^+A^-$ in which:
$Q^+$ represents a cation chosen from quaternary and ternary ammonium, quaternary phosphonium, ternary sulfonium and guanidinium ions, and
$A^-$ represents any organic or inorganic anion capable of forming, with $Q^+$, a salt having a melting point of less than 20° C.

The quaternary and ternary ammonium ions are preferably those of formula $$N^+R^1R^2R^3R^4, \quad (I)$$

$$R^1R^2N^+=CR^3R^4 \quad (II)$$

$$R^1R^2N^+=CR^3-R^7-R^3C=N^+R^1R^2, \quad (III)$$

the quaternary phosphonium ions are preferably those of formula $$P^+R^1R^2R^3R^4, \quad (IV)$$

$$R^1R^2P^+=CR^3R^4, \text{ and} \quad (V)$$

$$R^1R^2P^+=CR^3-R^7-R^3C=P^+R^1R^2, \quad (V)$$

the ternary sulfonium ions are those of formula $$S^+R^1R^2R^3, \text{ and} \quad (VI)$$

the guanidinium ions are those of formula $$[C(NR^1R^2)(NR^3R^4)(NR^5R^6)]^+ \quad (VII)$$

where $R^1$, $R^2$, $R^3$, $R^4$, $R^5$ and $R^6$ each represent, independently of one another, a hydrogen atom, except when they are bonded to the nitrogen atom of the quaternary ammonium group, to the phosphorus atom of the quaternary phosphonium group or to the sulfur atom of the ternary sulfonium group, or a saturated or unsaturated, linear, branched or cyclic and aliphatic or aromatic $C_{1-30}$ hydrocarbon group optionally comprising one or more functional groups chosen from —CO$_2$R, —C(=O)R, —OR, —C(=O)RR', —C(=O)N(R)NR'R", —NRR', —SR, —S(=O)R, —SO$_2$R, —SO$_3$R, —CN, —N(R)P(=O)R'R', —PRR', —P(=O)RR', —P(OR)(OR') and —P(=O)(OR)(OR'), where R, R' and R", which are identical or different, each represent a hydrogen atom or a $C_{1-30}$ hydrocarbon radical, or, in the formulae (I), (II), (IV) and (V), $R^2$ and $R^3$ form, with the nitrogen atom or with the phosphorus atom, a 4- to 10-membered, preferably 5- or 6-membered, heterocycle comprising 1, 2 or 3 nitrogen atoms and/or phosphorus atoms, and
$R^7$ represents an alkylene or phenylene group.

The $R^1$, $R^2$, $R^3$, $R^4$, $R^5$ and $R^6$ groups are, for example, the methyl, ethyl, propyl, isopropyl, n-butyl, sec-butyl, tert-butyl, amyl, phenyl or benzyl groups. $R^7$ represents, for example, a methylene, ethylene or propylene radical.

The quaternary ammonium ions are preferably chosen from the 1-butyl-2,3-dimethylimidazolium, 1-butyl-3-methylimidazolium, 1-butyl-1-methylpyrrolidinium, 1-(2-hydroxyethyl)-3-methylimidazolium, 1-ethyl-3-methylimidazolium, 1-ethyl-1-methylpyrrolidinium, 1-hexyl-3-methylimidazolium, 1-methyl-1-propylpiperidinium, 3-methyl-1-octylimidazolium, 2,3-dimethyl-1-propylimidazolium, N-methyl-N-propylpyrrolidinium, N,N,N-tributyl-N-methylammonium, N-butyl-N,N,N-trimethylammonium, N-hexyl-N,N,N-trimethylammonium, 3-methyl-1-(phenylethyl)imidazolium, benzylethyldimethylammonium and benzyldimethyl-(phenylethyl)ammonium ions.

Mention may be made, as example of ternary ammonium ion, of the pyridinium ion and dimethylhydrobenzylammonium ion and methylhydroimidazolium.

The quaternary phosphonium ion is preferably the tetrabutylphosphonium or tributyltetradecylphosphonium ion.

Mention may be made, as preferred $A^-$ ions, of the halide, nitrate, sulfate, alkyl sulfate, phosphate, alkyl phosphate, acetate, haloacetate, tetrafluoroborate, tetrachloroborate, hexafluorophosphate, trifluorotris(pentafluoroethyl)phosphate, hexafluoroantimonate, fluorosulfonate, alcanesulfonate (for example methanesulfonate), perfluoroalcanesulfonate (for example trifluoromethanesulfonate), bis(perfluoroalkylsulfonyl)amide (for example bis(trifluoromethylsulfonyl)amide of formula $N(CF_3SO_2)_2^-$), tris-(trifluoromethylsulfonyl)methylide of formula $C(CF_3SO_2)_3^-$, bis(trifluoromethylsulfonyl)methylide of formula $HC(CF_3SO_2)_2^-$, tetra(trifluoroacetoxy)borate, bis(oxalato)borate, dicyanamide, tricyanomethylide, tetrachloroaluminate and chlorozincate ions.

The term "alkyl" or "alkane" is understood here to mean a linear or branched hydrocarbon chain comprising from 1 to 18 carbon atoms, preferably from 1 to 6 carbon atoms.

The choice will preferably be made of ionic liquids comprising, in their cationic part, at least one aromatic nucleus, such as phenyl or naphthyl, or 5- or 6-membered heteroaromatic nucleus comprising one or two nitrogen atoms.

The ionic liquids are preferably chosen from 1-butyl-3-methylimidazolium bis(trifluoromethylsulfonyl)amide, 1-butyl-2,3-dimethylimidazolium bis(trifluoromethylsulfonyl)amide, N-butyl-N-methylpyrrolidinium bis(trifluoromethylsulfonyl)amide, 1-ethyl-3-methylimidazolium bis(trifluoromethylsulfonyl)amide, 1-hexyl-3-methylimidazolium bis(trifluoromethylsulfonyl)amide, 1-methyl-1-propylpiperidinium bis(trifluoromethylsulfonyl)amide, 1-octyl-3-methylimidazolium bis(trifluoromethylsulfonyl)amide, 2,3-dimethyl-1-propylimidazolium bis(trifluoromethylsulfonyl)amide, N-propyl-N-methylpyrrolidinium bis(trifluoromethylsulfonyl)amide, N,N,N-tributyl-N-methylammonium bis(trifluoromethylsulfonyl)amide, N,N,N-trimethyl-N-butylammonium bis(trifluoromethylsulfonyl)amide, N,N,N-trimethyl-N-hexylammonium bis(trifluoromethylsulfonyl)amide, N,N,N-trimethyl-N-propylammonium bis(trifluoromethylsulfonyl)amide, 1-phenylethyl-3-methylimidazolium bis(trifluoromethylsulfonyl)amide, (phenylethyl)-dimethylbenzylammonium bis(trifluoromethylsulfonyl)amide, ethyldimethylbenzylammonium bis(trifluoromethylsulfonyl)amide, 1-butyl-3-methylimidazolium tetrafluoroborate, 1-(2-hydroxyethyl)-3-methylimidazolium tetrafluoroborate, 1-ethyl-3-methylimidazolium tetrafluoroborate, N,N,N-trimethyl-N-butylammonium tetrafluoroborate, N,N,N-trimethyl-N-hexylammonium tetrafluoroborate, 1-ethyl-3-methylimidazolium tetrafluoroborate, 1-butyl-3-methylimidazolium acetate, bromide, chloride, dicyanamide, hexafluorophosphate, hydrogensulfate, methanesulfonate, tetrachloroaluminate and trifluoromethanesulfonate, 1-butyl-1-methylpyrrolidinium acetate, chloride, bromide, dicyanamide, hexafluorophosphate, hydrogensulfate and trifluoromethanesulfonate, 1-(2-hydroxyethyl)-3-methylimidazolium bromide, chloride, dicyanamide and hexafluorophosphate, 1-ethyl-3-methylimidazolium bromide, chloride, hexafluorophosphate, tetrachloroaluminate and trifluoromethanesulfonate, 1-hexyl-3-methylimidazolium hexafluorophosphate, 1-hexyl-3-methylimidazolium trifluoromethanesulfonate, or hydromethylimidazolium chloride or methanesulfonate.

Among these ionic liquids, those included in the following list are RTIL as defined above: 1-butyl-3-methylimidazolium acetate, 1-butyl-3-methylimidazolium bis(trifluoromethylsulfonyl)amide, 1-butyl-3-methylimidazolium dicyanamide, 1-butyl-3-methylimidazolium hexafluorophosphate, 1-butyl-3-methylimidazolium tetrachloroaluminate, 1-butyl-3-methylimidazolium tetrafluoroborate, 1-butyl-3-methylimidazolium trifluoromethanesulfonate, 1-butyl-1-methylpyrrolidinium bis(trifluoromethylsulfonyl)amide, 1-butyl-1-methylpyrrolidinium dicyanamide, 1-(2-hydroxyethyl)-3-methylimidazolium hexafluorophosphate, 1-(2-hydroxyethyl)-3-methylimidazolium tetrafluoroborate, 1-ethyl-3-methylimidazolium bis(trifluoromethylsulfonyl)amide, 1-ethyl-3-methylimidazolium tetrachloroaluminate, 1-ethyl-3-methylimidazolium tetrafluoroborate, 1-ethyl-3-methylimidazolium trifluoromethanesulfonate, 1-hexyl-3-methylimidazolium bis(trifluoromethylsulfonyl)amide, 1-hexyl-3-methylimidazolium hexafluorophosphate, 1-hexyl-3-methylimidazolium tetrafluoroborate, 1-methyl-1-propylpiperidinium bis(trifluoromethylsulfonyl)amide, 2,3-dimethyl-1-propylimidazolium bis(trifluoromethylsulfonyl)amide, N-propyl-N-methylpyrrolidinium bis(trifluoromethylsulfonyl)amide, N,N,N-trimethyl-N-butylammonium bis(trifluoromethylsulfonyl)amide and N,N,N-trimethyl-N-propylammonium bis(trifluoromethylsulfonyl) amide.

In principle, use may be made, for the present invention, of any stable photochromic dye which is soluble in the ionic solvents described above. For obvious reasons, the choice will preferably be made of photochromic dyes exhibiting a large difference in transmission between the activated state and the inactivated state. The photochromic dyes are advantageously colorless in the nonactivated state.

Mention may be made, as an example of preferred families of photochromic dyes, of spirooxazines, spiroindoline[2,3] benzoxazines, chromenes, homoazaadamantane spirooxazines, spirofluorene-(2H)-benzopyrans, naphtho[2,1-b]pyrans and naphtho[1,2-b]pyrans.

The photochromic dye is preferably chosen from naphtho [2,1-b]pyrans and naphtho[1,2-b]pyrans.

The organic solvent miscible with the ionic liquid(s) is preferably chosen from ethyl 4-methoxyphenylacetate (EMPA), propylene carbonate, diphenylmethane, toluene, tetrabutylurea, γ-butyrolactone, acetophenone and solvents comprising a phthalate unit.

The liquid photochromic composition of the present invention preferably has a viscosity which allows it to be introduced into the very fine "cells" or "chambers" of optical devices, such as those described in application FR 2 872 589. This introduction preferably takes place by jet deposition of compositions of relatively low viscosity, using for example inkjet printing devices. Consequently, the photochromic compositions of the present invention preferably have a Brookfield viscosity, measured at 20° C., of less than 1000 centipoises, in particular between 9 and 100 centipoises.

The photochromic composition of the present invention is, of course, preferably essentially devoid of water and single-phase.

As explained in the introduction, ionic solvents exhibit the advantage, inter alia, of making it possible to obtain solutions of photochromic dyes which are relatively more concentrated than those of the prior art. The dissolution of the photochromic dyes preferably takes place under hot conditions, for example at temperatures of between 80 and 150° C., and then the composition is allowed to cool at ambient temperature before removing the solid residues therefrom. It was thus possible to achieve concentrations of photochromic dyes of 0.3 mol/l.

Consequently, the concentration of the photochromic dye in the photochromic compositions based on ionic solvents of the present invention is preferably between 0.01 and 0.4 mol/l, in particular between 0.05 and 0.3 mol/l.

The photochromic compositions of the present invention can additionally comprise any type of additive of use in the application envisaged, provided that it does not detrimentally affect the advantageous intrinsic properties of the compositions of the present invention. Mention may be made, as examples of such additives, of stabilizing agents, surface-active agents or dyes other than photochromic dyes.

A subject matter of the present invention is not only the photochromic compositions based on ionic solvent as such but also the use thereof in the manufacture of optical devices or components, such as corrective or noncorrective ophthalmic lenses and other parts designed to correct, protect or enhance the vision, which encompass, without being limited thereto, contact lenses, intraocular lenses, magnifying glasses and protective lenses. The optical devices or components also encompass windows for buildings or transportation vehicles, screens or optical switches.

The optical device is preferably an ophthalmic lens.

The optical device of the present invention preferably comprises an assembly of cells placed side by side parallel to a surface of the optical device, each cell being hermetically closed and containing said photochromic composition based on ionic solvent. The assembly of cells, placed side by side parallel to a surface of said optical device and containing said photochromic composition, is preferably formed in a transparent polymeric layer formed on a transparent rigid substrate. The technical characteristics and various embodiments of such optical devices, and also a process for the preparation of such devices, are described in detail in the application FR 2 872 589 of the Applicant Company.

EXAMPLE 1

A solution of each of the following photochromic dyes is prepared

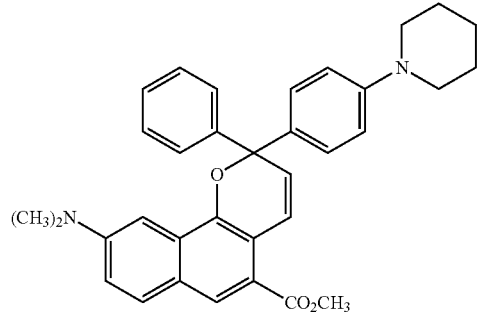

Dye 1

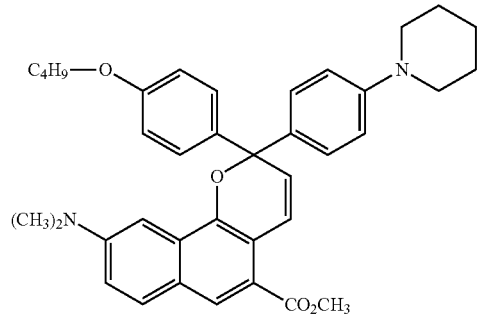

Dye 2

Dye 3

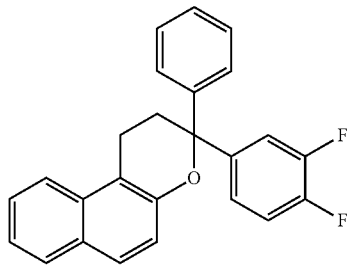

on the one hand in ethyl 4-methoxyphenylacetate (EMPA), an organic solvent conventionally used for the dissolution of photochromic dyes, and, on the other hand, in an "organic solvent" formed by a mixture of the following two ionic liquids:

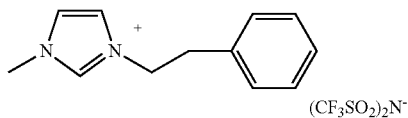

1-phenylethyl-3-methylimidazolium bis (trifluoromethylsulfonyl) amide

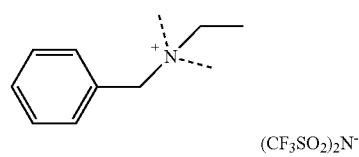

ethyldimethylbenzylammonium bis (trifluoromethylsulfonyl) amide

The following are collated in table 1 below for each of the solutions thus prepared:
C: the concentration of the solution prepared (in mol/l)
$\lambda_{max}$: the wavelength of maximum absorption of the dissolved dye
$T_0$: the transmission of the solution before irradiation
$T_{5min}$: the transmission after irradiating with UV radiation for five minutes
$\Delta T = T_0 - T_{5min}$: the difference between the transmission in a decolored state and in the activated (colored) state
$T_{3/4}$: the time necessary to return, after halting the UV irradiation, to a quarter of the coloration amplitude, expressed as optical density

TABLE 1

| Dye | Solvent | C (mol/l) | $\lambda_{max}$ (nm) | $T_0$ (%) | $T_{5/min}$ (%) | $\Delta T$ | $T_{3/4}$ (sec) |
| --- | --- | --- | --- | --- | --- | --- | --- |
| Dye 1 | EMPA | 0.083 | 425 | 93.82 | 91.51 | 2.11 | 36.5 |
|  | Ionic solvent |  | 452 | 92.90 | 91.71 | 1.19 | 12 |
| Dye 2 | EMPA | 0.032 | 587 | 89.54 | 45.04 | 44.5 | 25.2 |
|  | Ionic solvent |  | 600 | 92.76 | 78.93 | 13.83 | 10.6 |
| Dye 3 | EMPA | 0.026 | 587 | 88.45 | 64.28 | 24.19 | 9.7 |
|  | Ionic solvent |  | 604 | 94.88 | 82.37 | 12.51 | 6.1 |

The kinetic parameters of dyes 2 and 3 are presented in table 2 below (dye 1 not exhibiting a sufficiently high $\Delta T$ for the calculation). The decoloration parameters were analyzed by using a standard bi-exponential function:

$$A(t) = A_1 e^{-k1 t} + A_2 T e^{-k2 t}$$

where
$A(t)$=optical density,
$A_1$ and $A_2$=respective contributions to the initial optical density of the rapid and slow components,
k1 and k2=decoloration rate constants for the rapid and slow components (in seconds$^{-1}$).

TABLE 2

| Dye | Solvent | k1 (s$^{-1}$) | k2 (s$^{-1}$) | $A_1$ | $A_2$ |
| --- | --- | --- | --- | --- | --- |
| Dye 2 | EMPA | 3.374 | 0 | 0.355 | 0.049 |
|  | Ionic solvent | 7.95 | 0 | 0.103 | 0.033 |
| Dye 3 | EMPA | 8.59 | 0 | 0.211 | 0.054 |
|  | Ionic solvent | 13.99 | 0.02 | 0.116 | 0.024 |

These results show that, at equal concentration, the difference in transmission between the inactivated (colorless) state and the activated (colored) state is, in all cases, two to three times lower in the ionic solvent (mixture of two ionic liquids). However, this disadvantage can be largely compensated for by increasing the concentration of the photochromic dyes in the mixture of ionic liquids.

Furthermore, it is found that the time necessary to return, after halting irradiation, to one quarter of the optical density is considerably reduced in an ionic solvent. Specifically, table 2 shows that the main rate constant (k1) is always greater in the case of the ionic liquid.

A surprising secondary effect, known as "bathochromic effect" is also observed: thus, in the case of an ionic solvent in comparison with a conventional organic solvent, a shift in the absorption maximum ($\lambda_{max}$ (nm)) towards high wavelengths is observed.

EXAMPLE 2

In this example, each of two photochromic dyes, namely Reversacol® Midnight Grey (dye 4) and dye 5 of formula

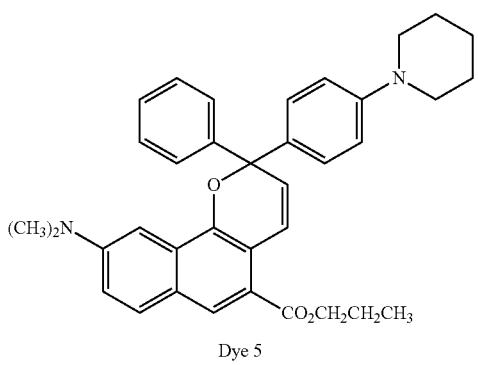

Dye 5 is dissolved in a series of ionic liquids and, by way of comparison, in EMPA:

The differences in transmission (ΔT) and the deactivation times ($T_{3/4}$) after halting irradiation are collated in table 3 below for each of the solutions thus prepared:

TABLE 3

| Dye | Ionic solvent or EMPA | C | | ΔT | $T_{3/4}$ |
|---|---|---|---|---|---|
| Dye 4 | 1-ethyl-3-methylimidazolium BTSA | 0.0335 | (mol/l) | 17.87 | 5.4 |
| | 1,2-dimethyl-3-butylimidazolium BTSA | 0.0335 | (mol/l) | 23.66 | 6.7 |
| | 1-butyl-3-methylimidazolium BTSA | 0.0248 | (mol/l) | 23.88 | 8.0 |
| | 1-butyl-3-methylimidazolium hexafluorophosphate | 0.0336 | (mol/l) | 8.8 | 6.9 |
| | 1-butyl-3-methylimidazolium dicyanamide | 0.0211 | (mol/l) | 21.47 | 17.3 |
| | N-butyl-N-methylpyrrolidinium BTSA | 0.028 | (mol/l) | 30.76 | 13.4 |
| | N-butyl-N-methylpyrrolidinium BTSA | 0.325 | (mol/l) | 52.33 | 13.9 |
| | N,N,N-trimethyl-N-butylammonium BTSA | 0.0297 | (mol/l) | 33.08 | 16.9 |
| | EMPA (comparative) | 0.03 | (mol/l) | 55.38 | 25.4 |
| Dye 5 | 1-ethyl-3-methylimidazolium BTSA | 3.0% | by weight | 30.93 | 6.9 |
| | N-butyl-N-methylpyrrolidinium BTSA | 3.0% | by weight | 46.70 | 13.8 |
| | 1-butyl-3-methylimidazolium dicyanamide | 2.98% | by weight | 36.98 | 15.4 |
| | N,N,N-trimethyl-N-butylammonium BTSA | 2.98% | by weight | 48.67 | 17.5 |
| | N-butyl-N-methylpyrrolidinium BTSA | 5.84% | by weight | 53.81 | 15.2 |
| | EMPA (comparative) | 3.0% | by weight | 65.17 | 26 |

BTSA = Bis(trifluoromethylsulfonyl)amide
EMPA = ethyl 4-methoxyphenylacetate (comparative organic solvent)

It is found that, as for the solutions of example 1, the decoloration time ($T_{3/4}$) for the photochromic dye dissolved in an ionic solvent is systematically lower than that found in a conventional solvent, such as EMPA.

EXAMPLE 3

This example illustrates the influence of the ionic solvent/organic solvent ratio on the decoloration kinetics of photochromic dyes.

0.03 mol/L of dye 5 of example 2 is dissolved in different mixtures of solvents having an increasing content of ionic liquid and the decoloration time ($T_{3/4}$) after halting irradiation with UV radiation is determined. The ionic liquid is that used in example 1, that is to say a mixture of 1-phenylethyl-3-methylimidazolium bis(trifluoromethylsulfonyl)amide and of ethyldimethylbenzylammonium bis-(trifluoromethylsulfonyl)amide. The results are presented in table 4 below.

TABLE 4

Decoloration kinetics of a photochromic dye as a function of the ionic liquid content of the solvent

| Ethyl 4-methoxyphenylacetate/ionic liquid ratio | $T_{3/4}$ |
|---|---|
| 100/0 | 54 seconds |
| 75/25 | 54 seconds |

TABLE 4-continued

Decoloration kinetics of a photochromic dye as a function of the ionic liquid content of the solvent

| Ethyl 4-methoxyphenylacetate/ionic liquid ratio | $T_{3/4}$ |
|---|---|
| 50/50 | 54 seconds |
| 75/25 | 30 seconds |
| 0/100 | 18 seconds |

These results show that, for dye 5 and for this combination of organic solvent (EMPA) and of ionic liquid, the rate of decoloration of the dye does not change for ionic liquid contents of less than or equal to 50%. Beyond this value, the decoloration time is substantially shortened, all the more so as the content of ionic liquid increases.

What is claimed is:

1. A single-phase photochromic composition which is liquid at 20° C. and which comprises:
   (a) at least one photochromic dye chosen from the group consisting of spirooxazines, spiroindoline[2,3]benzoxazines, chromenes, homoazaadamantane spirooxazines, spirofluorene-(2H)-benzopyrans, naphtho[2,1-b]pyrans and naphtho[1,2-b]pyrans, and
   (b) an ionic solvent.

2. The photochromic composition as claimed in claim 1, wherein the ionic solvent is chosen from the group consisting of
   (b)(i) room-temperature ionic liquids (RTIL),
   (b)(ii) mixtures, liquid at ambient temperature, of ionic liquids, and
   (b)(iii) mixtures, liquid at ambient temperature, of at least one ionic liquid and of at least one organic solvent which is miscible with the ionic liquid(s).

3. The photochromic composition as claimed in claim 1 wherein the ionic liquids (b) are chosen from organic salts of formula $Q^+A^-$ in which
   $Q^+$ represents an organic cation chosen from quaternary or ternary ammonium, quaternary phosphonium, ternary sulfonium and guanidinium ions, and
   $A^-$ represents any organic or inorganic anion capable of forming, with $Q^+$, a salt having a melting point of less than 100° C.

4. The photochromic composition as claimed in claim 1, wherein the room-temperature ionic liquids (RTILs) are chosen from the salts of formula $Q^+A^-$ in which:

Q⁺ represents a cation chosen from ternary and quaternary ammonium, quaternary phosphonium, ternary sulfonium and guanidinium ions, and A⁻ represents any organic or inorganic anion capable of forming, with Q⁺, a salt having a melting point of less than 20° C.

5. The photochromic composition as claimed in claim 3, wherein Q⁺ represents a cation chosen from the group consisting of:

ternary and quaternary ammonium ions of formula $$N^+R^1R^2R^3R^4, \quad (I)$$

$$R^1R^2N^+{=}CR^3R^4 \quad (II)$$

$$R^1R^2N^+{=}CR^3{-}R^7{-}R^3C{=}N^+R^1R^2, \quad (III)$$

quaternary phosphonium ions of formula $$P^+R^1R^2R^3R^4, \quad (IV)$$

$$R^1R^2P^+{=}CR^3R^4, \text{ and} \quad (V)$$

$$R^1R^2P^+{=}CR^3{-}R^7{-}R^3C{=}P^+R^1R^2, \quad (V)$$

ternary sulfonium ions of formula $$S^+R^1R^2R^3, \text{ and} \quad (VI)$$

guanidinium ions of formula $$[C(NR^1R^2)(NR^3R^4)(NR^5R^6)]^+ \quad (VII)$$

where $R^1$, $R^2$, $R^3$, $R^4$, $R^5$ and $R^6$ each represent, independently of one another, a hydrogen atom, except when they are bonded to the nitrogen atom of the quaternary ammonium group, to the phosphorus atom of the quaternary phosphonium group or to the sulfur atom of the ternary sulfonium group, or a saturated or unsaturated, linear, branched or cyclic and aliphatic or aromatic $C_{1-30}$ hydrocarbon group optionally comprising one or more functional groups chosen from —CO₂R, —C(=O)R, —OR, —C(=O)RR', —C(=O)N(R) NR'R", —NRR', —SR, —S(=O)R, —SO₂R, —SO₃R, —CN, —N(R)P(=O)R'R', —PRR', —P(=O)RR, —P(OR)(OR') and —P(=O)(OR)(OR'), where R, R' and R", which are identical or different, each represent a hydrogen atom or a $C_{1-30}$ hydrocarbon radical, or, in the formulae (I), (II), (IV) and (V), $R^2$ and $R^3$ form, with the nitrogen atom or with the phosphorus atom, a 4- to 10-membered, heterocycle comprising 1, 2 or 3 nitrogen atoms and/or phosphorus atoms, and $R^7$ represents an alkylene or phenylene group, and A⁻ represents an anion chosen from halide, nitrate, sulfate, alkyl sulfate, phosphate, alkyl phosphate, acetate, haloacetate, tetrafluoroborate, tetrachloroborate, hexafluorophosphate, trifluorotris(pentafluoroethyl)phosphate, hexafluoroantimonate, fluorosulfonate, alcanesulfonate, perfluoroalcanesulfonai e, bis(perfluoroalkylsulfonyl)amide, tris-(trifluoromethylsulfonyl)methylide of formula $C(CF_3SO_2)_3^-$, bis(trifluoromethylsulfonyl)methylide of formula $HC(CF_3SO_2)_2^-$, tetra(trifluoroacetoxy)-borate, bis(oxalato)borate, dicyanamide, tricyanomethylide, tetrachloroaluminate and chlorozincate ions.

6. The composition as claimed in claim 1, wherein the ionic liquids are chosen from the group consisting of 1-butyl-3-methylimidazolium bis(trifluoromethylsulfonyl)amide, 1-butyl-2,3-dimethylimidazolium bis(trifluoromethylsulfonyl)amide, N-butyl-N-methylpyrrolidinium bis(trifluoromethylsulfonyl)amide, 1-ethyl-3-methylimidazolium bis(trifluoromethylsulfonyl)amide, 1-hexyl-3-methylimidazolium bis(trifluoromethylsulfonyl)amide, 1-methyl-1-propylpiperidinium bis(trifluoromethylsulfonyl)amide, 1-octyl-3-methylimidazolium bis(trifluoromethylsulfonyl)amide, 2,3-dimethyl-1-propylimidazolium bis(trifluoromethylsulfonyl)amide, N-propyl-N-methylpyrrolidinium bis(trifluoromethylsulfonyl)amide, N,N,N-tributyl-N-methylammonium bis(trifluoromethylsulfonyl)amide, N,N,N-trimethyl-N-butylammonium bis(trifluoromethylsulfonyl)amide, N,N,N-trimethyl-N-hexylammonium bis(trifluoromethylsulfonyl)amide, N,N,N-trimethyl-N-propylammonium bis(trifluoromethylsulfonyl)amide, 1-phenylethyl-3-methylimidazolium bis(trifluoromethylsulfonyl)amide, (phenylethyl)-dimethylbenzylammonium bis(trifluoromethylsulfonyl)amide, ethyldimethylbenzylammonium bis(trifluoromethylsulfonyl)amide, 1-butyl-3-methylimidazolium tetrafluoroborate, 1-(2-hydroxyethyl)-3-methylimidazolium tetrafluoroborate, 1-ethyl-3-methylimidazolium tetrafluoroborate, N,N,N-trimethyl-N-butylammonium tetrafluoroborate, N,N,N-trimethyl-N-hexylammonium tetrafluoroborate, 1-ethyl-3-methylimidazolium tetrafluoroborate, 1-butyl-3-methylimidazolium acetate, bromide, chloride, dicyanamide, hexafluorophosphate, hydrogensulfate, methanesulfonate, tetrachloroaluminate and trifluoromethanesulfonate, 1-butyl-1-methylpyrrolidinium acetate, chloride, bromide, dicyanamide, hexafluorophosphate, hydrogensulfate and trifluoromethanesulfonate, 1-(2-hydroxyethyl)-3-methylimidazolium bromide, chloride, dicyanamide and hexafluorophosphate, 1-ethyl-3-methylimidazolium bromide, chloride, hexafluorophosphate, tetrachloroaluminate and trifluoromethanesulfonate, 1-hexyl-3-methylimidazolium hexafluorophosphate, 1-hexyl-3-methylimidazolium trifluoromethanesulfonate, and hydromethylimidazolium chloride or methanesulfonate.

7. The composition as claimed in claim 2, wherein the organic solvent miscible with the ionic liquid(s) is chosen from the group consisting of ethyl 4-methoxyphenylacetate (EMPA), propylene carbonate, diphenylmethane, toluene, tetrabutylurea, γ-butyrolactone, acetophenone and solvents comprising a phthalate unit.

8. The composition as claimed in claim 1, said compositing exhibiting a viscosity at 20° C. of less than 1000 centipoises.

9. The composition as claimed in claim 1, wherein the concentration of the photochromic dye is between 0.01 and 0.4 mol/l.

10. An optical device, comprising a photochromic composition as claimed in claim 1.

11. The optical device as claimed in claim 10, characterized in that it comprises an assembly of cells placed side by side parallel to a surface of the optical device, each cell being hermetically closed and containing said photochromic composition.

12. The optical device as claimed in claim 11, wherein the assembly of cells placed side by side parallel to a surface of said optical device and containing said photochromic composition is formed in a transparent polymeric layer formed on a transparent rigid substrate.

* * * * *